HOAGLAND & MOSER.
Corn Sheller and Fan.
No. 68,744.
Patented Sept. 10, 1867.
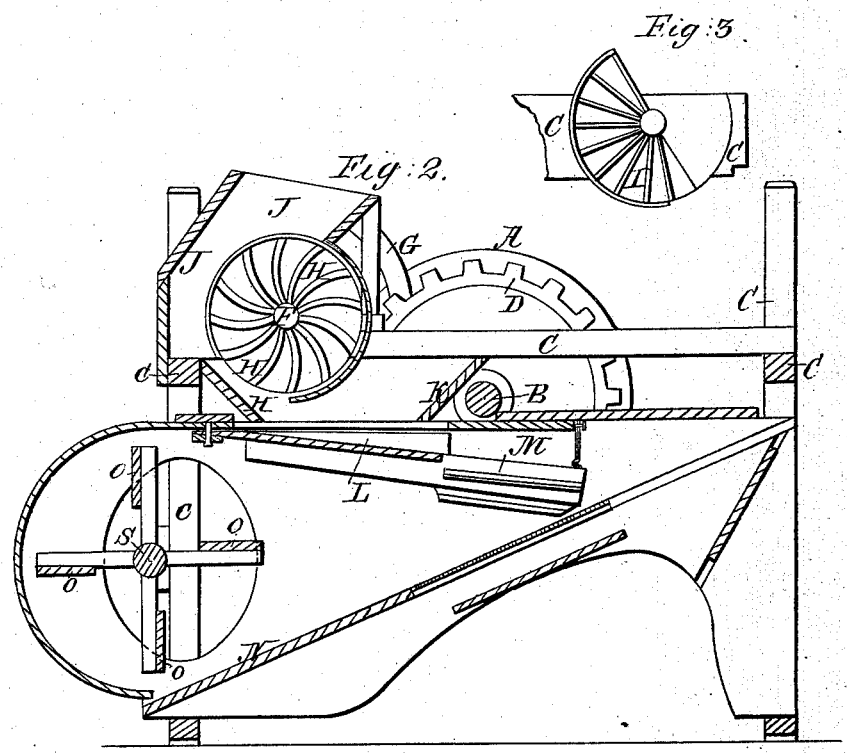
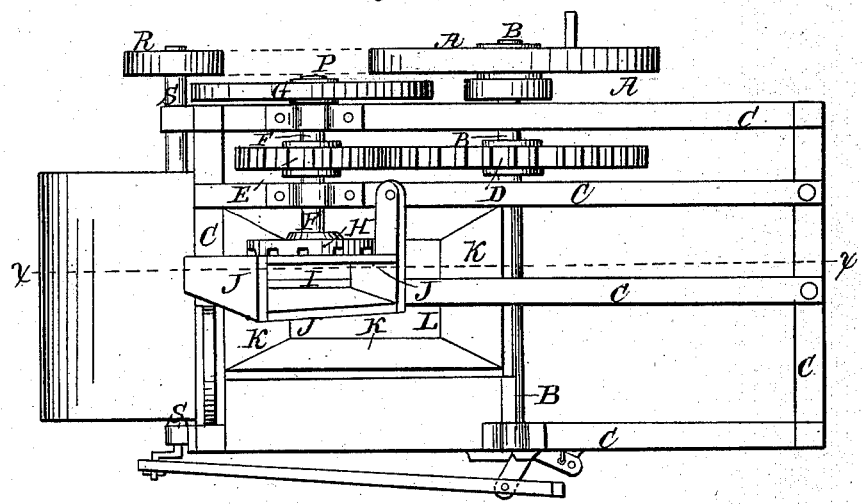
Witnesses
Theo Fuscho
W. Trevin
Inventors
J. P. Hoagland
J. E. Moser

United States Patent Office.

J. P. HOAGLAND AND GEORGE E. MOSER, OF CENTRALIA, PENNSYLVANIA.

Letters Patent No. 68,744, dated September 10, 1867.

IMPROVEMENT IN COMBINED CORN-SHELLER AND FANNING-MILL.

The Schedule referred to in these Letters Patent and making part of the same.

TO ALL WHOM IT MAY CONCERN:

Be it known that we, J. P. HOAGLAND and GEORGE E. MOSER, of Centralia, in the county of Columbia, and State of Pennsylvania, have invented a new and improved Combined Corn-Sheller and Fan-Mill; and we do hereby declare that the following is a full, clear, and exact description thereof, which will enable those skilled in the art to make and use the same, reference being had to the accompanying drawings, forming part of this specification, in which—

Figure 1 is a top view of our improved machine.

Figure 2 is a vertical longitudinal section of the same, taken through the line $x$ $x$, fig. 1.

Figure 3 is a detail view of the stationary sheller plate.

Similar letters of reference indicate corresponding parts.

Our invention has for its object to furnish an improved machine, by means of which the corn may be rapidly and thoroughly shelled and cleaned ready for use or market at one operation; and it consists in the construction of the sheller, and in its combination with a fan-mill; the whole being constructed and arranged as hereinafter more fully described.

A is the drive or crank-wheel, the shaft B of which revolves in bearings in the frame C of the machine. D is a large cog-wheel attached to the shaft B, and the teeth of which mesh into the teeth of the cog-wheel E attached to the sheller-shaft F, which revolves in bearings in the frame C. To the outer end of the shaft F is attached a fly-wheel, G, and to its inner end is attached the sheller-plate or wheel H. The face of the sheller-wheel H is formed with curved grooves or ribs extending from its centre to the circumference, and gradually increasing in depth or height from the centre outward. I is the stationary sheller-plate, which is attached to the frame C in such a position as to face the lower part of the wheel or plate H. The face of the plate I is corrugated or ribbed, as shown in fig. 3, to correspond with the wheel H. The wheel H and plate I are so set that their lower edges may be near each other, and gradually separate or incline from each other as they rise. J is a chute or hopper surrounding the forward and upper parts of the wheel H and plate I, and rising above them to guide the ears of corn to the shelling-plates. The rear part of the shelling-plates should be encased to prevent the corn from flying off, and also to prevent the ears or cobs from escaping too soon from the sheller.

From the sheller the corn and cobs pass into the fan-mill hopper K, from which they pass down the shaker L to the sieves or screens M, by which the cobs and chaff are separated from the corn, the chaff being blown out at the rear of the mill, the cobs passing out at the bottom of the mill, and the corn passing down the inclined boards N and out at the front end of the mill. O are the fans, which are driven by a band, P, passing around the pulley or crank-wheel A, and around the pulley R, attached to the end of the fan-shaft S.

The fan-mill is so constructed that it may be used for cleaning other kinds of grain by arranging the sieves and screen properly, the sheller being removed or not, as may be convenient.

We claim as new, and desire to secure by Letters Patent—

1. The sheller, formed by the combination and arrangement of the stationary sheller-plate I, sheller-wheel H, and hopper or chute J, with each other, substantially as herein shown and described, and for the purpose set forth.

2. The combination of the sheller-wheel H, shaft F, fly-wheel G, cog-wheel E, cog-wheel D, shaft B, drive or crank-wheel A, band P, pulley R, and fan-shaft S, with each other, for the purpose of operating the sheller and fan by the same power, substantially as herein shown and described.

J. P. HOAGLAND,
G. E. MOSER.

Witnesses:
JOSHUA MENDENHALL,
M. W. McHENRY.